(12) United States Patent
Lopes et al.

(10) Patent No.: US 10,462,327 B2
(45) Date of Patent: Oct. 29, 2019

(54) DOCUMENT ELEMENT RE-POSITIONING

(71) Applicant: Hewlett-Packard Development Company, L.P., Houston, TX (US)

(72) Inventors: Marlon Gomes Lopes, Vancouver, WA (US); Leandro Hernandes Manica, Porto Alegre (BR); Fabio Santos Nallem, Barueri (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/070,879

(22) PCT Filed: May 13, 2016

(86) PCT No.: PCT/US2016/032372
§ 371 (c)(1),
(2) Date: Jul. 18, 2018

(87) PCT Pub. No.: WO2017/196366
PCT Pub. Date: Nov. 16, 2017

(65) Prior Publication Data
US 2019/0037098 A1    Jan. 31, 2019

(51) Int. Cl.
*G06F 17/21*    (2006.01)
*H04N 1/32*    (2006.01)
*G06F 3/12*    (2006.01)
*G06F 16/00*    (2019.01)
*G06F 16/93*    (2019.01)

(52) U.S. Cl.
CPC .......... *H04N 1/3247* (2013.01); *G06F 3/125* (2013.01); *G06F 3/1208* (2013.01); *G06F 3/1219* (2013.01); *G06F 3/1242* (2013.01); *G06F 3/1287* (2013.01); *G06F 16/00* (2019.01); *G06F 16/93* (2019.01); *G06F 17/211* (2013.01); *G06F 17/212* (2013.01); *H04N 1/32144* (2013.01)

(58) Field of Classification Search
CPC .. H04N 1/3247; H04N 1/32144; G06F 16/93; G06F 16/958; G06F 3/1208; G06F 3/1242; G06F 3/125; G06F 3/1287; G06F 17/211
USPC ..................... 358/1.18, 3.28, 1.15
See application file for complete search history.

(56) References Cited

U.S. PATENT DOCUMENTS

| 6,252,971 | B1 * | 6/2001 | Wang .................... G06T 1/0021 |
| | | | 382/100 |
| 6,820,094 | B1 | 11/2004 | Ferguson et al. |
| 7,051,086 | B2 | 5/2006 | Rhoads et al. |
| 7,249,319 | B1 | 7/2007 | Payne et al. |

(Continued)

FOREIGN PATENT DOCUMENTS

EP    1630641 B1    6/2015

OTHER PUBLICATIONS

Cheryl, "Print Relevant Information from a Web Page with PrintWhatYouLike," http://www.ghacks.net, Oct. 1, 2008, 4 pages.

*Primary Examiner* — Jamares Q Washington
(74) *Attorney, Agent, or Firm* — HP Inc. Patent Department

(57) ABSTRACT

Examples disclosed herein relate to receiving a document comprising a plurality of document elements, removing a first document element of the plurality of document elements from the document, re-positioning a second document element of the plurality of document elements in the document, and inserting a new document element comprising a link to a source of the document.

15 Claims, 5 Drawing Sheets

(56) References Cited

U.S. PATENT DOCUMENTS

| | | | |
|---|---|---|---|
| 9,152,357 B2 | 10/2015 | Hwang et al. | |
| 9,182,932 B2 | 11/2015 | Chopra et al. | |
| 2004/0044894 A1* | 3/2004 | Lofgren | G06T 1/0028 |
| | | | 713/176 |
| 2004/0095400 A1 | 5/2004 | Anderson et al. | |
| 2006/0147083 A1* | 7/2006 | Piersol | G06F 21/16 |
| | | | 382/100 |
| 2007/0101257 A1 | 5/2007 | Lynn et al. | |
| 2008/0168135 A1* | 7/2008 | Redlich | G06Q 10/10 |
| | | | 709/204 |
| 2010/0281351 A1 | 11/2010 | Mohammed | |
| 2011/0043831 A1* | 2/2011 | Sprague | G06F 3/1219 |
| | | | 358/1.2 |
| 2013/0332807 A1 | 12/2013 | Forstall et al. | |
| 2014/0237350 A1* | 8/2014 | Ryall | H04L 65/403 |
| | | | 715/234 |

\* cited by examiner

DOCUMENT ELEMENT RE-POSITIONING

BACKGROUND

In some situations, a user may desire to retrieve digital content and/or documents, such as web pages. Oftentimes, this content may comprise multiple elements in addition to the primary content in which the user is interested, such as navigation menus, ads, and the like.

BRIEF DESCRIPTION OF THE DRAWINGS

In the accompanying drawings, like numerals refer to like components or blocks. The following detailed description references the drawings, wherein.

DETAILED DESCRIPTION

Users often retrieve and/or read documents comprising multiple elements in complex layouts. For example, a news story or article from a website may comprise elements such as text, pictures, links, menu bars, advertisements, split frames, multiple columns, etc. The user may desire to read the content in a cleaner layout, on a screen, downloaded as a file for reading later, and/or as a printed copy. The user may be discouraged by bad experiences with the native printing of web browsers and devices that access digital content, as the print or view result may show large areas of blank space or areas with no relevant content such as pictures and advertisements, resulting in a waste of pages and ink for printing or an unnecessary increase in file size.

Re-arranging the relevant document elements may present a cleaner document that may be printed and/or saved more easily and with less waste. Such a re-arranged document, however, may lose source information. Such information may be desirable should the user wish to go back and view the original document. In such cases, the address and/or other identifying information of the content source could be inserted in a way and that allows the user to go back to the original content without interfering with the clean visual appearance of the re-arranged document. For example, source information could be inserted into a non-visible layer of an electronic file of the document. For a printed example, a digital link element, such as a watermark, barcode, matrix code, steganography code, or URL, could be added to the document in an area that does not interfere with the relevant content.

The re-arranging of the content elements of the document may be performed by a service application that can extract each document element, determine whether the element comprises relevant content, and render a new document layout with the relevant content and a link to the source document. For example, a web browser may launch the service application upon receiving a print or save command from the user.

In some implementations, the service application may rely on content tags in the underlying HTML code that may identify the primary relevant content, such a "<div>" sections labeled as "main". Numerous other tags and labels may be relied upon, and rules may be added and/or updated within the service application to help identify relevant content. In some implementations, the user may manually select the elements to be deemed relevant, such as by highlighting the text and/or via a user interface that allows the user to select various elements to be saved and/or discarded.

Figure 1A:
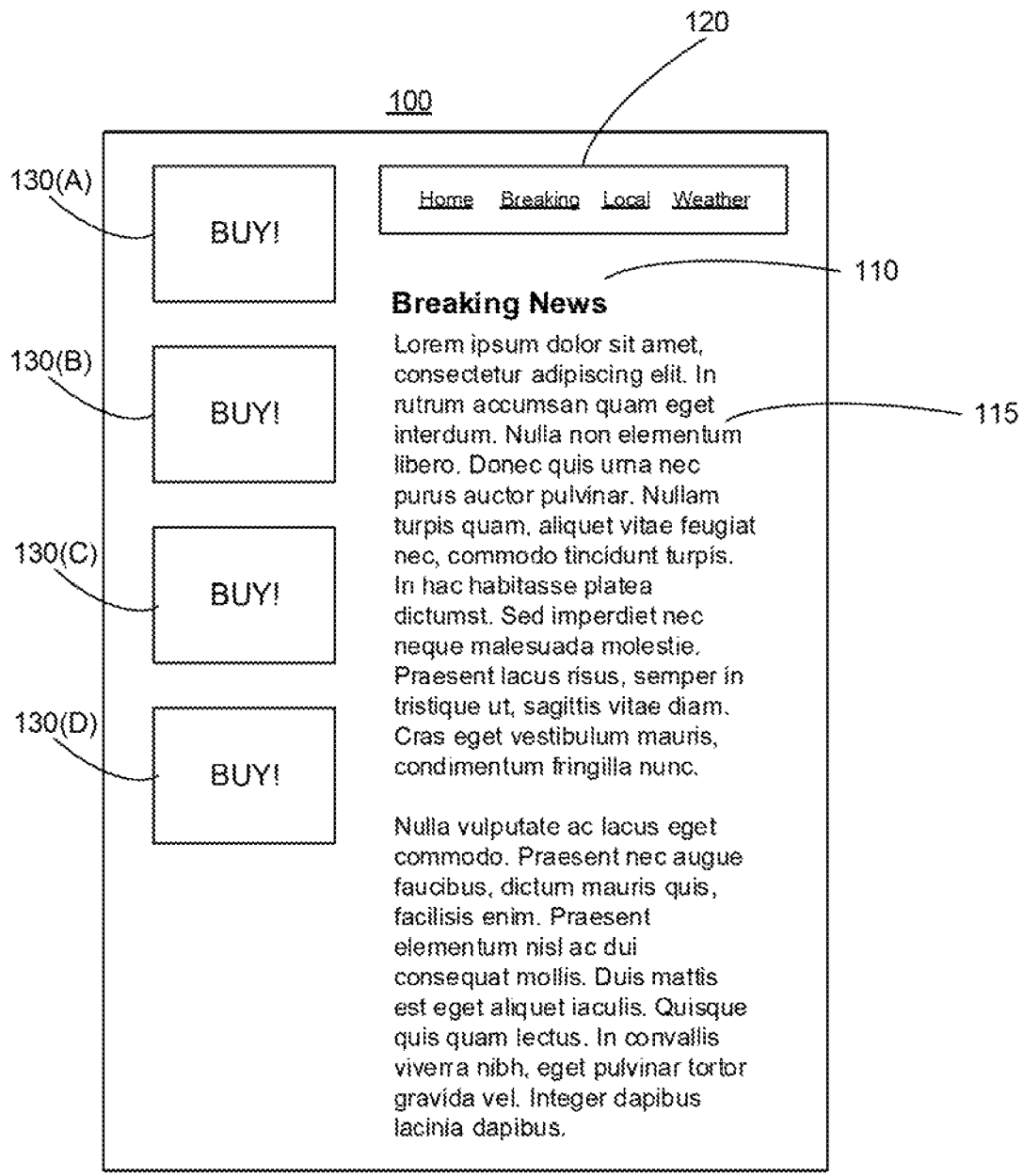
FIGS. 1A-1B are block diagrams of an example document.

Referring now to the drawings, FIG. 1A is a block diagram of an example document 100 comprising a plurality of elements. Document 100 comprises a content title element 110, a content text element 115, a menu element 120, and a plurality of advertising elements 130(A)-(D). Document 100 may represent, for example, a web page comprising a news article. Such a web page may be associated with a uniform resource locator (URL) comprising a network location from which the document 100 may be retrieved. Each element of document 100 may be defined, for example, using hypertext markup language (HTML), such as via the use of "<div>" tags.

Figure 1B:
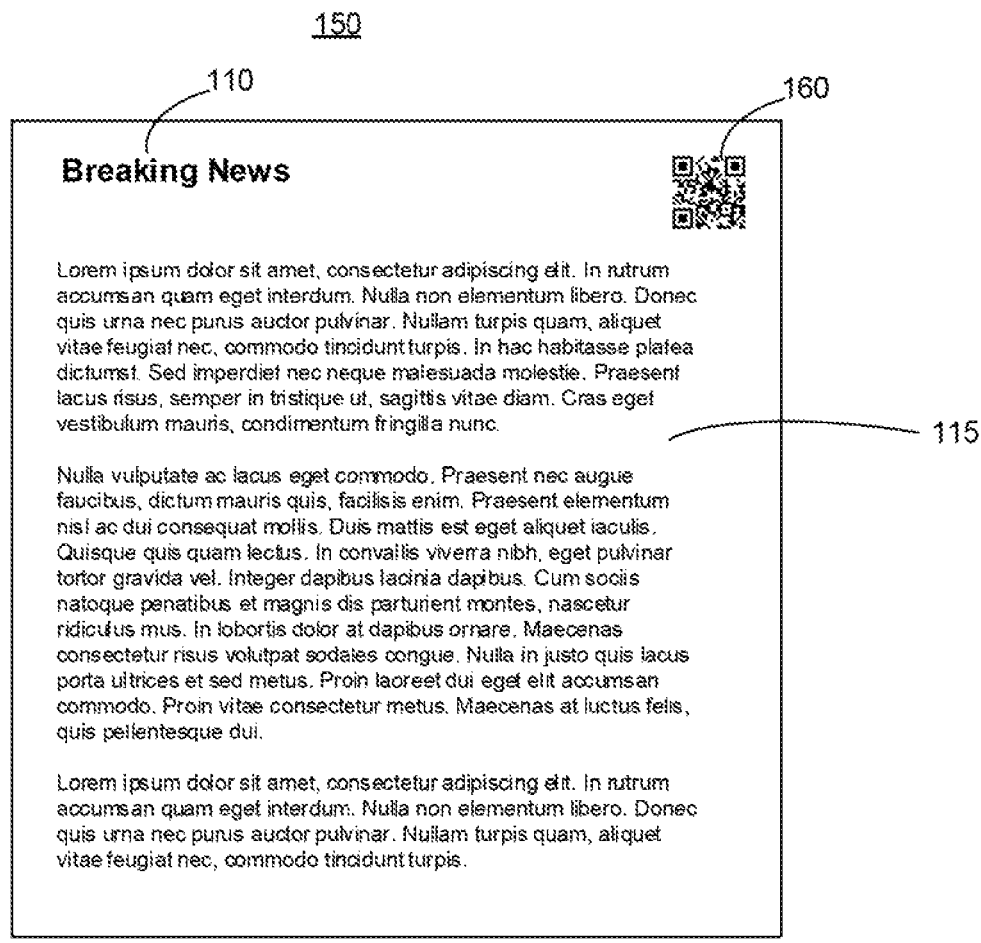

FIG. 1B is a block diagram of an example document 150 comprising re-positioned elements of document 100. In document 150, menu element 120 and advertising elements 130(A)-(D) have been removed. Content title element 110 and content text element 115 have been re-positioned. A source link element 160 has been added to document 150 comprising encoded information about a source of the original document 100. For example, source link element 160 may comprise an encoded URL that, when scanned with a link scanning application, may open the original document 100 from the source location. The content elements 110, 115 of document 100 have been re-positioned in document 150 to improve readability by removing extraneous or distracting elements. The re-positioning may also result in a reduced number of pages to print document 150 if desired by the user.

Figure 2:
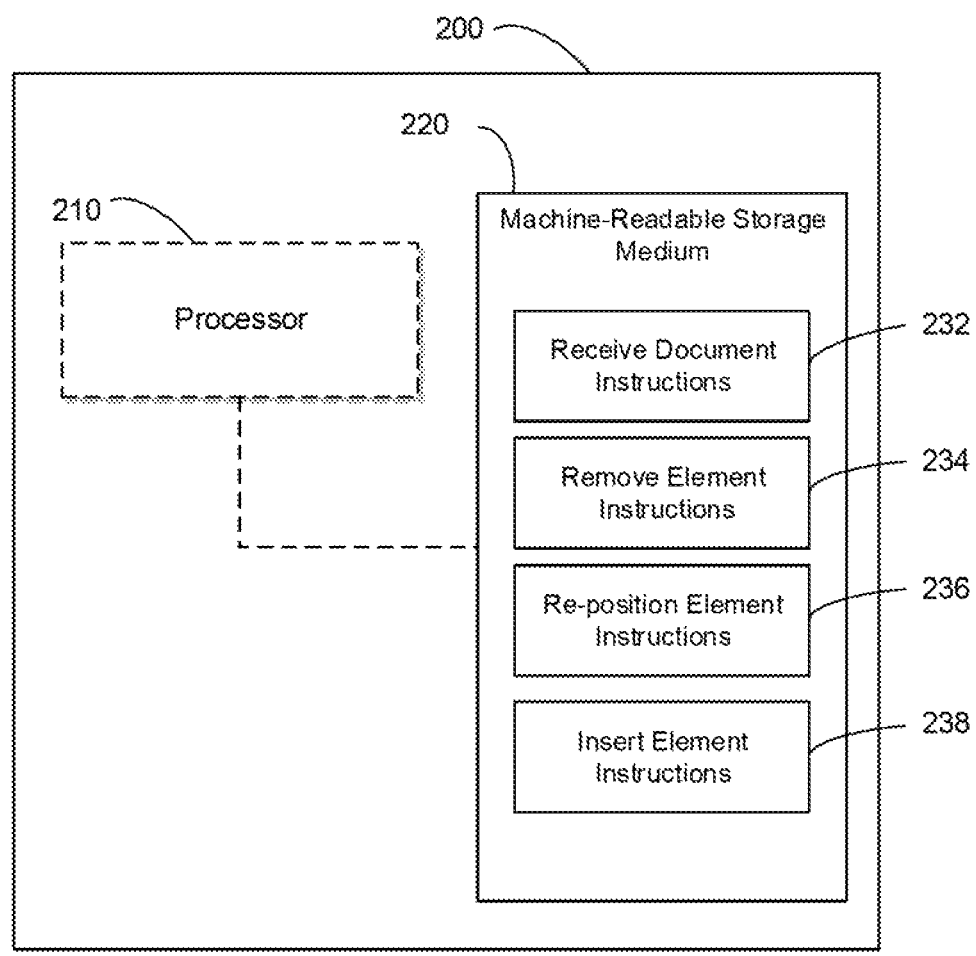
FIG. 2 is a block diagram of an example document element re-positioning device.

FIG. 2 is a block diagram of an example document element re-positioning device 200 consistent with disclosed implementations. Document element re-positioning device 200 may comprise a processor 210 and a non-transitory machine-readable storage medium 220. Document element re-positioning device 200 may comprise a computing device such as a server computer, a desktop computer, a laptop computer, a handheld computing device, a smart phone, a tablet computing device, a mobile phone, a network device (e.g., a switch and/or router), a peripheral device, a printing device, or the like.

Processor 210 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 220. In particular, processor 210 may fetch, decode, and execute a plurality of receive document instructions 232, remove element instructions 234, re-position element instructions 236, and insert element instructions 238.

Executable instructions may comprise logic stored in any portion and/or component of machine-readable storage medium 220 and executable by processor 210. The machine-readable storage medium 220 may comprise both volatile and/or nonvolatile memory and data storage components. Volatile components are those that do not retain data values upon loss of power. Nonvolatile components are those that retain data upon a loss of power.

The machine-readable storage medium 220 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive document instructions 232 may receive a document comprising a plurality of document elements. For example, the document may comprise a web page comprising a plurality of elements defined by underlying HTML. Such a web page may be illustrated by document 100, comprising content elements 110, 115, and advertising elements 130(A)-(D). The document may be received via a user request to save, modify, and/or print the document, for example. Such a request may be made in order to make a version of a network accessible document available offline and/or in hardcopy (printed) form.

Remove element instructions 234 may remove a first document element of the plurality of document elements from the document. For example, instructions 234 may re-write the underlying HTML defining the document's structure to remove undesired and/or irrelevant elements from the document, such as advertising elements 130(A)-(D). In some implementations, the advertising elements may simply have the HTML associated with their display deleted from the document. In other implementations, the HTML associated with the removed elements may be hidden, such as by activating a "hidden" element attribute and/or surrounding the removed elements with comment tags (e.g., <!--[removed element]-->). The elements to be removed may, for example, be selected by the user via a user interface. The user may simply click and/or highlight on various elements in the document to select whether they should be kept and/or removed. In some implementations, the element(s) to be removed may be identified according to keywords stored in a list, which may be periodically updated and/or comprise a heuristically learned list based on prior user requests to hide elements. For example, if the user has previously requested to remove an element with a source attribute of "advertising.com", such elements may be automatically selected for removal in a subsequent operation of instructions 234.

Different document types may support different types of element hiding. For example, Portable Document Format (PDF) documents support storing document elements in different layers that may be rendered hidden and/or visible independently. For other examples, spreadsheet documents often support hiding rows and columns from display, while presentation documents support hiding portions of slides (e.g., presenter notes) and/or entire slides from display and printing.

Remove element instructions 234 may further comprise instructions to create a relevance score for each of the plurality of document elements. The relevance score may, for example, be based on an image analysis of the document element, a source of the document element, a string associated with the document element, a text content of the document element, a size of the document element, and a type of the document element. For example, a news story may be analyzed for positioning of elements in relation to each other, such as a headline and a body of text. Other elements, such as links associated with "related stories" may be scored as less relevant, and advertising elements may be scored still lower. Such scores may, for example, comprise a 1-100 value where the body of text has the highest relevance score of 100, the headline has associated relevance of 90. Related links may comprise a score such as 50 below a relevance threshold of 75. These scores are offered as examples only, and may be adjusted and/or configured to improve the process of identifying relevant elements. In some implementations, remove element instructions 234 may further comprise instructions to remove any of the document elements comprising a relevance score below a threshold score.

Re-position element instructions 236 may re-position a second document element of the plurality of document elements in the document. For example, a side column of advertisement elements 130(A)-(D) may be removed so that content text element 115 may span the full width of document 100. In such an example, content title element 110 may be moved to maintain its relative position to content text element 115, as illustrated in example document 150.

Re-position element instructions 236 may further comprise instructions to reduce a number of pages required to print the document. For example, spanning content text element 115 across the width of document 150 may reduce the number of pages to print the content. Re-positioning the content may also comprise modifications such as removing line breaks and/or changing font sizes.

Insert element instructions 238 may insert a new document element comprising a link to a source of the document. For example, the link to the source may comprise a network address and/or URL. The link may comprise additional information such as a date the document was accessed, credentials used, and/or an integrity value such as a checksum calculated on the original and/or modified document. The link may be inserted as a visible and/or a hidden element. For example, the link may be simply be a plain text of the source document URL inserted in a portion of the document so as not to overlap and/or interfere with the content elements 110, 115.

In some implementations, insert element instructions 238 may comprise instructions to insert a digital watermark into the document. Such a digital watermark may be inserted as a visible element and/or may be inserted into a non-visible layer of the document. Such digital watermarks may comprise, for example, a bar code, a matrix code, a partially or wholly transparent set of text and/or images, and/or a steganographic pattern. Such a link may be read by an appropriate image capture application, such as a smartphone app, and/or a code scanner. The link, once read, may be decoded to provide access to the source document 100 from its original location. In some implementations, a hidden element may need to be made visible for an app to read it. In others, a reader application may identify a hidden element link and offer the ability to link back to the original document via a user interface element.

Figure 3:
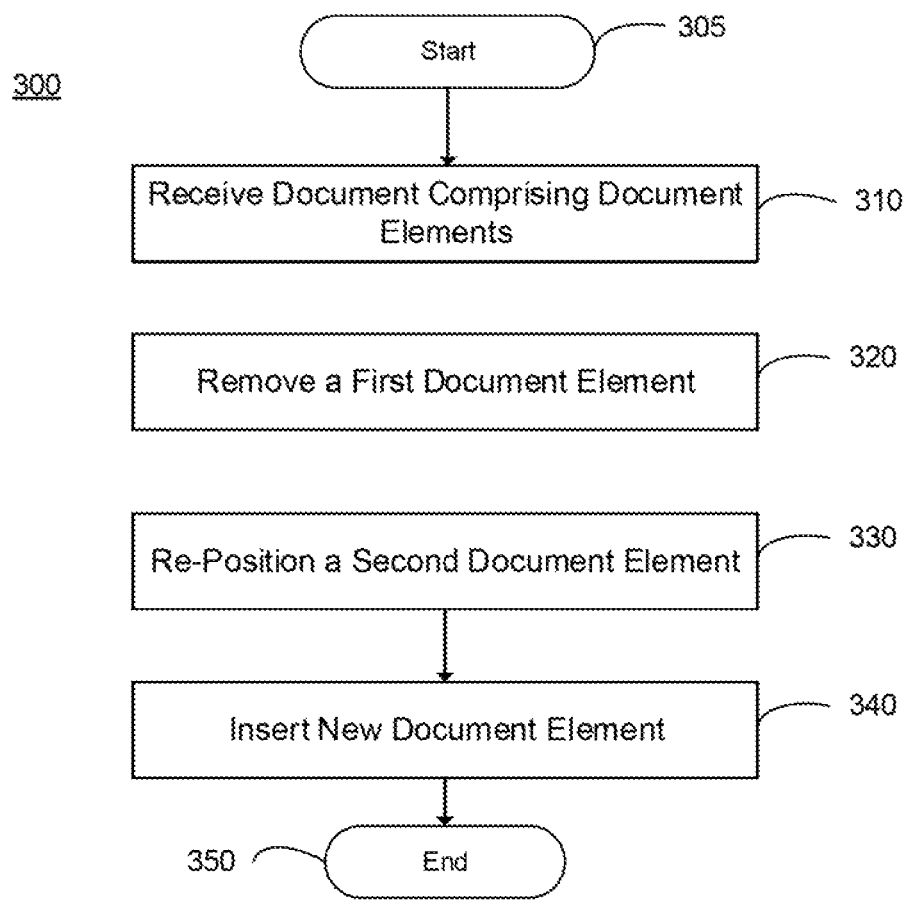
FIG. 3 is a flowchart of an example of a method for providing document element re-positioning.

FIG. 3 is a flowchart of an example method 300 for providing document element re-positioning consistent with disclosed implementations. Although execution of method 300 is described below with reference to device 200, other suitable components for execution of method 300 may be used.

Method 300 may begin in stage 305 and proceed to stage 310 where device 200 may receive a document comprising a plurality of document elements. For example, receive document instructions 232 may receive a document comprising a plurality of document elements. For example, the document may comprise a web page comprising a plurality of elements defined by underlying HTML. Such a web page may be illustrated by document 100, comprising content elements 110, 115, and advertising elements 130(A)-(D). The document may be received via a user request to save, modify, and/or print the document, for example. Such a request may be made in order to make a version of a network accessible document available offline and/or in hardcopy (printed) form.

Method 300 may then advance to stage 320 where device 200 may remove a first document element of the plurality of document elements from the document. For example, remove element instructions 234 may remove a first document element of the plurality of document elements from the document. For example, instructions 234 may re-write the underlying HTML defining the document's structure to remove undesired and/or irrelevant elements from the document, such as advertising elements 130(A)-(D). In some implementations, the advertising elements may simply have the HTML associated with their display deleted from the document. In other implementations, the HTML associated with the removed elements may be hidden, such as by activating a "hidden" element attribute and/or surrounding the removed elements with comment tags (e.g., <!--[removed element]-->). The element(s) to be removed may, for example, be selected by the user via a user interface. The user may simply click and/or highlight on various elements in the document to select whether they should be kept and/or removed. In some implementations, the element(s) to be removed may be identified according to keywords stored in a list, which may be periodically updated and/or comprise a heuristically learned list based on prior user requests to hide elements. For example, if the user has previously requested to remove an element with a source attribute of "advertising.com", such elements may be automatically selected for removal in a subsequent operation of instructions 234.

Different document types may support different types of element hiding. For example, Portable Document Format (PDF) documents support storing document elements in different layers that may be rendered hidden and/or visible independently. For other examples, spreadsheet documents often support hiding rows and columns from display, while presentation documents support hiding portions of slides (e.g., presenter notes) and/or entire slides from display and printing.

Remove element instructions 234 may further comprise instructions to create a relevance score for each of the plurality of document elements. The relevance score may, for example, be based on an image analysis of the document element, a source of the document element, a string associated with the document element, a text content of the document element, a size of the document element, and a type of the document element. For example, a news story may be analyzed for positioning of elements in relation to each other, such as a headline and a body of text. Other elements, such as links associated with "related stories" may be scored as less relevant, and advertising elements may be scored still lower. Such scores may, for example, comprise a 1-100 value where the body of text has the highest relevance score of 100, the headline has associated relevance of 90. Related links may comprise a score such as 50 below a relevance threshold of 75. These scores are offered as examples only, and may be adjusted and/or configured to improve the process of identifying relevant elements. In some implementations, remove element instructions 234 may further comprise instructions to remove any of the document elements comprising a relevance score below a threshold score.

Method 300 may then advance to stage 330 where device 200 may re-position a second document element of the plurality of document elements in the document. For example, re-position element instructions 236 may re-position a second document element of the plurality of document elements in the document. For example, a side column of advertisement elements 130(A)-(D) may be removed so that content text element 115 may span the full width of document 100. In such an example, content title element 110 may be moved to maintain its relative position to content text element 115, as illustrated in example document 150.

Re-position element instructions 236 may further comprise instructions to reduce a number of pages required to print the document. For example, spanning content text element 115 across the width of document 150 may reduce the number of pages to print the content. Re-positioning the content may also comprise modifications such as removing line breaks and/or changing font sizes.

Method 300 may then advance to stage 340 where device 200 may insert a new document element comprising a link to a source of the document. Such a new document element may comprise, for example, a digital watermark. The new document element may, for example, comprise a visible and/or a hidden document element. A hidden document element may, in some implementations, be associated with a hidden layer of the document. In some implementations, the hidden document element is made visible in a printed format of the document. The new document element may comprise an integrity value associated with the document. For example, insert element instructions 238 may insert a new document element comprising a link to a source of the document. For example, the link to the source may comprise a network address and/or URL. The link may comprise additional information such as a date the document was accessed, credentials used, and/or an integrity value such as a checksum calculated on the original and/or modified document. The link may be inserted as a visible and/or a hidden element. For example, the link may be simply be a plain text of the source document URL inserted in a portion of the document so as not to overlap and/or interfere with the content elements 110, 115.

In some implementations, insert element instructions 238 may comprise instructions to insert a digital watermark into the document. Such a digital watermark may be inserted as a visible element and/or may be inserted into a non-visible layer of the document. Such digital watermarks may comprise, for example, a bar code, a matrix code, a partially or wholly transparent set of text and/or images, and/or a steganographic pattern. Such a link may be read by an appropriate image capture application, such as a smartphone app, and/or a code scanner. The link, once read, may be decoded to provide access to the source document 100 from its original location. In some implementations, a hidden element may need to be made visible for an app to read it. In others, a reader application may identify a hidden element link and offer the ability to link back to the original document via a user interface element.

Method 300 may then end at stage 350.

Figure 4:
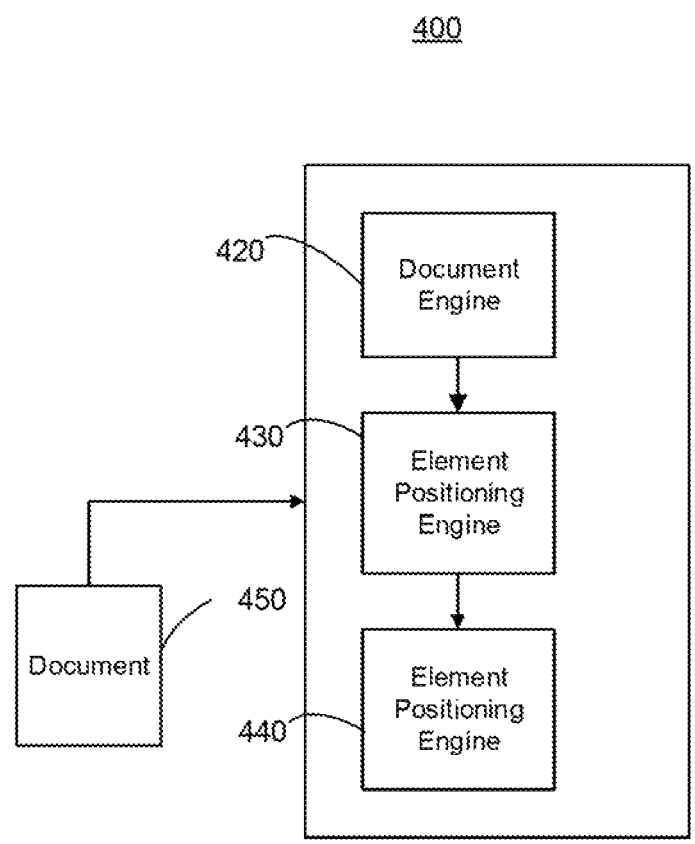
FIG. 4 is a block diagram of an example system for providing document element re-positioning.

FIG. 4 is a block diagram of an example system 400 for providing document element re-positioning. System 400 may comprise a computing device 410 comprising a memory 415, a document engine 420, an element positioning engine 430, and a watermark engine 440. Engines 420, 430, 440 may be associated with a single computing device 410 and/or may be communicatively coupled among different devices such as via a direct connection, bus, or network. Each of engines 420, 430, 440 may comprise hardware and/or software associated with computing devices. In some implementations, computing device 410 may also comprise a communicatively coupled printing device.

Document engine 420 may assign a relevance score to each document element of a plurality of document elements in a document 450. For example, remove element instructions 234 may comprise instructions to create a relevance score for each of the plurality of document elements. The relevance score may, for example, be based on an image analysis of the document element, a source of the document element, a string associated with the document element, a text content of the document element, a size of the document element, and a type of the document element. For example, a news story may be analyzed for positioning of elements in relation to each other, such as a headline and a body of text. Other elements, such as links associated with "related stories" may be scored as less relevant, and advertising elements may be scored still lower. Such scores may, for example, comprise a 1-100 value where the body of text has the highest relevance score of 100, the headline has associated relevance of 90. Related links may comprise a score such as 50 below a relevance threshold of 75. These scores are offered as examples only, and may be adjusted and/or configured to improve the process of identifying relevant elements. In some implementations, remove element instructions 234 may further comprise instructions to remove any of the document elements comprising a relevance score below a threshold score.

Element positioning engine 430 may remove a first document element of the plurality of elements from the document 450, and re-position a second document element of the plurality of document elements in the document 450.

Watermark engine 440 may insert a new document element comprising a link to a source of the document. For example, insert element instructions 238 may insert a new document element comprising a link to a source of the document. For example, the link to the source may comprise a network address and/or URL. The link may comprise additional information such as a date the document was accessed, credentials used, and/or an integrity value such as a checksum calculated on the original and/or modified document. The link may be inserted as a visible and/or a hidden element. For example, the link may be simply be a plain text of the source document URL inserted in a portion of the document so as not to overlap and/or interfere with the content elements 110, 115.

In some implementations, insert element instructions 238 may comprise instructions to insert a digital watermark into the document. Such a digital watermark may be inserted as a visible element and/or may be inserted into a non-visible layer of the document. Such digital watermarks may comprise, for example, a bar code, a matrix code, a partially or wholly transparent set of text and/or images, and/or a steganographic pattern. Such a link may be read by an appropriate image capture application, such as a smartphone app, and/or a code scanner. The link, once read, may be decoded to provide access to the source document 100 from its original location. In some implementations, a hidden element may need to be made visible for an app to read it. In others, a reader application may identify a hidden element link and offer the ability to link back to the original document via a user interface element.

The disclosed examples may include systems, devices, computer-readable storage media, and methods for document element re-positioning. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions which, when executed by a processor, cause the processor to:
   receive a document comprising a plurality of document elements;
   create a relevance score for each of the plurality of document elements;
   determine that a first relevance score for a first document element of the plurality of document elements is less than a threshold score and that a second relevance score for a second document element of the plurality of document elements is greater than the threshold score;
   remove the first document element from the document based on the determination that the first relevance score is less than the threshold score;
   re-position the second document element in the document based on the determination that the second relevance score is greater than the threshold score; and
   insert a new document element comprising a link to a source of the document.

2. The non-transitory machine-readable medium of claim 1, wherein the instructions are further to cause the processor to reduce a number of pages required to print the document.

3. The non-transitory machine-readable medium of claim 1, wherein the instructions are further to cause the processor to remove any of the document elements comprising a relevance score below the threshold score.

4. The non-transitory machine-readable medium of claim 1, wherein the instructions are further to cause the processor to create the relevance score based on at least one of an image analysis of the document element, a source of the document element, a string associated with the document element, a text content of the document element, a size of the document element, or a type of the document element.

5. The non-transitory machine-readable medium of claim 1, wherein the instructions are further to cause the processor to insert a digital watermark into the document.

6. The non-transitory machine-readable medium of claim 5, wherein the instructions are further to cause the processor to insert the digital watermark into a non-visible layer of the document.

7. A computer-implemented method, comprising:
receiving a document comprising a plurality of document elements;
creating a relevance score for each of the plurality of document elements;
determining that a first relevance score for a first document element of the plurality of document elements is less than a threshold score and that a second relevance score for a second document element of the plurality of document elements is greater than the threshold score;
removing the first document element from the document based on a determination that the first relevance score is less than a threshold score;
re-positioning the second document element in the document based on a determination that the second relevance score is greater than the threshold score; and
inserting a new document element comprising a link to a source of the document.

8. The computer-implemented method of claim 7, wherein the new document element comprises a visible document element.

9. The computer-implemented method of claim 7, wherein the new document element comprises a hidden document element.

10. The computer-implemented method of claim 9, wherein the hidden document element is associated with a hidden layer of the document.

11. The computer-implemented method of claim 9, wherein the hidden document element is made visible in a printed format of the document.

12. The computer-implemented method of claim 7, wherein the new document element further comprises an integrity value associated with the document.

13. The computer-implemented method of claim 7, wherein the new document element comprises a digital watermark.

14. A system, comprising:
a processor; and
a machine-readable storage medium on which is stored instructions that, when executed by the processor, cause the processor to:
assign a relevance score to each element of a plurality of document elements in a document;
determine that a first relevance score for a first document element of the plurality of document elements is less than a threshold score and that a second relevance score for a second document element of the plurality of document elements is greater than the threshold score;
remove the first document element from the document based on the determination that the first relevance score is less than the threshold score;
re-position the second document element in the document based on the determination that the second relevance score is greater than the threshold score; and
insert a new document element comprising a link to a source of the document.

15. The system of claim 14, wherein the instructions are further to cause the processor to create the relevance score based on at least one of an image analysis of the document element, a source of the document element, a string associated with the document element, a text content of the document element, a size of the document element, or a type of the document element.

* * * * *